(12) United States Patent
Madlinger et al.

(10) Patent No.: US 12,508,158 B2
(45) Date of Patent: Dec. 30, 2025

(54) CONSOLE OF AN OPHTHALMIC SURGICAL SYSTEM AND OPHTHALMIC SURGICAL SYSTEM

(71) Applicant: Carl Zeiss Meditec AG, Jena (DE)

(72) Inventors: Philipp Madlinger, Oberkochen (DE); Sonja Laicher, Oberkochen (DE); Christian Diekow, Oberkochen (DE)

(73) Assignee: Carl Zeiss Meditec AG, Jena (DE)

( * ) Notice: Subject to any disclaimer, the term of this patent is extended or adjusted under 35 U.S.C. 154(b) by 0 days.

(21) Appl. No.: 18/952,731

(22) Filed: Nov. 19, 2024

(65) Prior Publication Data

US 2025/0073068 A1    Mar. 6, 2025

Related U.S. Application Data

(63) Continuation of application No. PCT/EP2023/062726, filed on May 12, 2023.

(30) Foreign Application Priority Data

Jun. 8, 2022    (DE) .................. 10 2022 114 354.6

(51) Int. Cl.
*A61F 9/007*    (2006.01)
(52) U.S. Cl.
CPC ........................ *A61F 9/00745* (2013.01)
(58) Field of Classification Search
CPC .................................................. A61F 9/00745
See application file for complete search history.

(56) References Cited

U.S. PATENT DOCUMENTS 6,175,180 B1 *  1/2001  Angelini ............ A61F 9/00745
                                                              310/318
9,144,517 B2    9/2015  Kuebler et al.
(Continued)

FOREIGN PATENT DOCUMENTS

DE    10 2010 047 009 A1    4/2012
DE    10 2020 118 887 A1    1/2022

OTHER PUBLICATIONS

International Search Report of the European Patent Office dated Aug. 4, 2023 for international application PCT/EP2023/062726 on which this application is based, 3 pages.
(Continued)

*Primary Examiner* — Andrew Restaino
(74) *Attorney, Agent, or Firm* — Walter Ottesen, P.A.

(57)    ABSTRACT

A console of an ophthalmic surgical system is for operating a surgical handpiece which includes a treatment needle and a drive for driving the treatment needle by oscillation. The console includes a generator configured to provide a time-varying drive signal for the drive, an evaluation unit, and a detection unit. The detection unit is electrically couplable to the drive and detects a contact signal of the drive on account of a second oscillation amplitude in a low-oscillation state of the needle in which the needle oscillates at a maximum first oscillation amplitude. The generator provides the drive signal such that the drive is deactivated during the low-oscillation state. The evaluation unit evaluates the contact signal and determines contact of a particle with the needle on a basis of the evaluation. The detection unit detects the contact signal when the second oscillation amplitude is greater than the first oscillation amplitude.

17 Claims, 4 Drawing Sheets

(56) References Cited

U.S. PATENT DOCUMENTS

| | | |
|---|---|---|
| 12,072,363 B2* | 8/2024 | Ertz .................. B06B 1/0253 |
| 2005/0261715 A1 | 11/2005 | Boukhny et al. |
| 2013/0218168 A1 | 8/2013 | Hauger et al. |
| 2021/0353462 A1 | 11/2021 | Fritz et al. |
| 2021/0361481 A1* | 11/2021 | Gliner .................. A61B 34/73 |

OTHER PUBLICATIONS

English translation and International Preliminary Report on Patentability of the European Patent Office dated Jul. 19, 2024 for international application PCT/EP2023/062726 on which this application is based, 13 pages.

\* cited by examiner

CONSOLE OF AN OPHTHALMIC SURGICAL SYSTEM AND OPHTHALMIC SURGICAL SYSTEM

CROSS-REFERENCE TO RELATED APPLICATIONS

This application is a continuation application of international patent application PCT/EP2023/062726, filed May 12, 2023, designating the United States and claiming priority from German application 10 2022 114 354.6, filed Jun. 8, 2022, and the entire content of both applications is incorporated herein by reference.

TECHNICAL FIELD

The disclosure relates to a console of an ophthalmic surgical system for operating an ophthalmic surgical handpiece which is connectable to the console and includes a treatment needle and an electrical drive unit for driving the treatment needle by oscillation. The console includes at least one generator unit for providing a time-varying electrical drive signal for the electrical drive unit. Finally, the disclosure also relates to an ophthalmic surgical system for treating an eye, having at least one ophthalmic surgical handpiece for working on an eye lens. The ophthalmic surgical handpiece includes a treatment needle and an electrical drive unit for driving the treatment needle by oscillation. The ophthalmic surgical system also includes a console for operating the ophthalmic surgical handpiece, to which the ophthalmic surgical handpiece is connectable at least during an intended operation. The console includes a generator unit which is couplable to the handpiece and serves to provide a time-varying electrical drive signal for the electrical drive unit of the handpiece.

BACKGROUND

Ophthalmic surgical systems, consoles and handpieces serve inter alia the treatment of lens opacification in an eye lens of an eye of a living being, for example a human or an animal. In medicine, lens opacification is referred to as a cataract, inter alia. One possibility for treating lens opacification provides for replacing the crystalline lens of the eye by an artificial lens. For example, phacoemulsification is a technique for treating the opacification of a lens. Phacoemulsification can be performed via the ophthalmic surgical system.

One important assembly for performing phacoemulsification is the ophthalmic surgical handpiece, which hereinafter is referred to just as handpiece. The handpiece includes a treatment needle mechanically connected to a drive unit of the handpiece. During intended operation, the treatment needle is driven by oscillation via the drive unit. As a rule, a tip of the drive needle is driven to implement vibrations in the ultrasonic range, for example in a range from approximately 10 kHz to approximately 80 kHz. Contact of a needle tip of the treatment needle with the crystalline eye lens to be exchanged or replaced leads to the latter being emulsified, that is, comminuted, with lens fragments or particles being released. As a rule, an irrigation fluid is supplied to the eye during the treatment within the scope of phacoemulsification. At the same time, an aspiration fluid is drained from a region of the eye operated on. To this end, the treatment needle is generally configured as a hollow needle, whereby a part of an aspiration line which opens in a region of the needle tip can be provided. The particles released during the emulsification of the eye lens are removed from the region operated on via the aspiration line, together with the aspiration fluid. Once the crystalline eye lens has been removed in this manner, an artificial eye lens is inserted in its place. This can essentially complete the treatment on the eye, and vision can be at least partially restored.

It is known that heat might be generated, inter alia as a result of friction, on account of the mechanical ultrasonic movement of the treatment needle during the treatment of the eye. Firstly, this can reduce the effectiveness in relation to emulsification of the crystalline eye lens and, secondly, lead to an undesirably large local heat input into the eye, which may lead to irreversible damage to the eye. Further, lens fragments or particles to be flushed, or already adherent lens fragments or particles, might be repulsed, especially in the case of longitudinal oscillations of the needle tip of the treatment needle. This can lengthen the time required for the operation, whereby an energy input into the eye, which leads to the generation of heat, might also be increased. In this context, for example US2013/0218168 A1 discloses a control apparatus for an ophthalmic surgical system which allows the power of the drive unit to be controlled on the basis of particle properties of the particles, which have been determined via an optical system.

According to the teaching of US2013/0218168 A1, a separate optical system is required and moreover requires image processing so that the particle properties can be determined in order to control the amount of ultrasound energy supplied to the handpiece on the basis thereof. Should the image processing be operated at a high resolution, it may require relatively comprehensive signal processing and lead to a significant delay in relation to an adjustment speed.

US2005/0261715 A1 describes a control system for operating an ultrasonic handpiece for an emulsification of an eye lens, the ultrasonic handpiece including a control console. The ultrasonic handpiece is connected to a power supply in the control console by way of a power cable. The control console includes a CPU which, by way of a cable, is capable of varying the output power of the power supply transmitted to the ultrasonic handpiece and a cutting tip of the ultrasonic handpiece. Piezo crystals in the ultrasonic handpiece are driven by this output power and oscillate in order to output ultrasonic energy. Connectors are connected to the output or the power cable of the power supply. The connectors themselves are coupled to feedback components of the control system for a current and a voltage. The feedback components are used to carry out voltage and current measurements during detection intervals in which less power is supplied to the handpiece (detection power) and which alternate with cutting intervals in which greater power (cutting power) is supplied, the measurements being based on mechanical stresses which the piezoelectric crystals in the handpiece are subject to when the tip contacts tissue. During a detection interval, a power value calculated from a measured voltage and a measurement current is used to determine a contact of the tip with a material such as an eye lens from an increase in the power value. Hence, the control system is able to detect when the cutting tip is no longer in contact with eye lens tissue or is in contact with different sections of an eye lens tissue of varying degrees of hardness and adapts a power that is supplied to the ultrasonic handpiece during the cutting intervals. The power supplied to the ultrasonic handpiece in a detection interval is always greater than zero, with the result that tissue can also still be cut here, and should be greater than zero so that a load on the tip can be detected.

US2021/0361481 A1 discloses a phacoemulsification device including a console. A phacoemulsification probe is connected to the console via a cable. The phacoemulsification probe contains a piezoelectric actuator therein in order to allow a needle configured for insertion into an eye lens capsule of an eye to oscillate in one or more resonant modes. For this purpose, the console includes a piezoelectric drive system which is coupled to piezoelectric crystals of the actuator via the cable. By way of the cable, drive modules of the drive system supply processor-controlled drive signals to the piezoelectric actuator in order to adapt frequencies of a multi-resonant mode of the piezoelectric actuator in order to keep the needle at a maximum oscillation amplitude. A direction and an amplitude of a needle displacement are estimated using magnetic sensors in the phacoemulsification probe and used by the processor and the drive modules to control the actuator via the cable in order to keep the needle oscillating in resonance. The processor calculates a derivative of the output signals from the magnetic sensors over time and notifies a user with regards to engagement with an eye medium, that is, the eye lens, when the derivative exceeds a threshold value.

SUMMARY

It is an object of the disclosure to provide a console and an ophthalmic surgical system to the effect of, inter alia, being able to further reduce the heat input during a treatment to be performed on the eye, with a relatively fast and reliable treatment on the eye being achievable.

The above object is, for example, achieved via a console of an ophthalmic surgical system for operating an ophthalmic surgical handpiece which is connectable to the console and includes a treatment needle and an electrical drive unit for driving the treatment needle by oscillation. The console includes: at least one generator unit configured to provide a time-varying electrical drive signal for the electrical drive unit; a detection unit electrically couplable to the electrical drive unit, the detection unit being configured to detect an electrical contact signal of the electrical drive unit on account of a second oscillation amplitude in a low-oscillation state of the treatment needle in which the treatment needle oscillates at a maximum first oscillation amplitude; the at least one generator unit being configured to provide the drive signal such that the drive unit is deactivated during the low-oscillation state; an evaluation unit configured to evaluate the detected electrical contact signal and to determine contact of a particle with the treatment needle on a basis of the evaluation; and, the detection unit being configured to detect the contact signal when the second oscillation amplitude is greater than the maximum first oscillation amplitude.

The above object is, for example, further achieved via an ophthalmic surgical system for treating an eye. The ophthalmic surgical system includes: an ophthalmic surgical handpiece for working on an eye lens, the ophthalmic surgical handpiece including a treatment needle and an electrical drive unit for driving the treatment needle by oscillation; a console for operating the ophthalmic surgical handpiece to which the ophthalmic surgical handpiece is connectable at least during an intended operation; the console including a generator unit which is couplable to the ophthalmic surgical handpiece and is configured to provide a time-varying electrical drive signal for the electrical drive unit of the ophthalmic surgical handpiece; the console including a detection unit electrically couplable to the electrical drive unit, the detection unit being configured to detect an electrical contact signal of the electrical drive unit on account of a second oscillation amplitude in a low-oscillation state of the treatment needle in which the treatment needle oscillates at a maximum first oscillation amplitude; the generator unit being configured to provide the drive signal such that the electrical drive unit is deactivated during the low-oscillation state; the console including an evaluation unit configured to evaluate the detected electrical contact signal and to determine contact of a particle with the treatment needle on a basis of the evaluation; and, the detection unit being configured to detect the contact signal when the second oscillation amplitude is greater than the first oscillation amplitude.

With the disclosure, it is proposed that in a low-oscillation state of the treatment needle in which the treatment needle oscillates at a maximum first oscillation amplitude, an electrical contact signal of the electrical drive unit is detected on account of a second oscillation amplitude of the treatment needle, the second oscillation amplitude being greater than the first oscillation amplitude, the detected electrical signal is evaluated and contact of the particle with the treatment needle is determined on the basis of the evaluation.

As regards a generic console, the disclosure proposes in particular that the console includes a detection unit electrically couplable to the drive unit, the detection unit being suitable for detecting an electrical contact signal of the electrical drive unit on account of a second oscillation amplitude in a low-oscillation state of the treatment needle in which the treatment needle oscillates at a maximum first oscillation amplitude, the second oscillation amplitude being greater than the first oscillation amplitude. The console also includes an evaluation unit for evaluating the detected electrical contact signal and for determining contact of a particle with the treatment needle on the basis of the evaluation.

As regards a generic ophthalmic surgical system, the disclosure proposes in particular that the console is configured according to the disclosure.

The disclosure is based inter alia on the idea that driving the treatment needle by oscillation generally only appears to be necessary when the treatment needle contacts the eye lens or a lens fragment or particle of the eye lens to be replaced. With the disclosure, it was recognized that the drive unit is not limited to unidirectional use for driving the treatment needle by oscillation; instead, it can also be used reversibly, inter alia, to output an electrical contact signal on the basis of a movement of the treatment needle in the event of contact with the lens fragment or particle. As a result, contact of the lens fragment or particle with the treatment needle can be determined by appropriate evaluation of an electrical contact signal accordingly provided by the drive unit. In this case, the disclosure also makes use of the insight that the drive unit can generally be operated bidirectionally. That is, an application of the electrical drive signal can lead to a mechanical movement of the treatment needle, whereas, conversely, a mechanical movement of the treatment needle can lead to an electrical contact signal. Accordingly, the disclosure not only makes use of the drive unit in relation to drive functionality but also renders possible the use of the drive unit in relation to sensor functionality at the same time.

The disclosure inter alia exploits the effect that contact of the treatment needle with the particle leads to a mechanical movement of the treatment needle, and this results in the electrical contact signal of the drive unit on account of the mechanical coupling to the drive unit. Depending on the configuration of the drive unit, the electrical contact signal can be an electric current or else a voltage, for example. The detection unit is configured in a manner appropriately adapted to the electrical contact signal such that the electrical contact signal output by the drive unit can be reliably detected. It is self-evident that a corresponding statement also applies to the drive signal, which is provided by the generator unit. The drive signal is a time-varying electrical drive signal which for example can be a time-varying voltage, in particular an AC voltage, or else a time-varying electric current, in particular an alternating electric current. The generator unit is configured appropriately in order to be able to provide the drive signal.

The electrical drive signal frequently is an AC voltage that is provided via the generator unit. For this purpose, the generator unit might include an electrical energy transducer or electrical energy converter in the style of an inverter, a converter or the like. The electrical drive unit can be configured as an electrostatic drive unit or else as an electromagnetic drive unit. As electrostatic drive unit, the drive unit can be configured in piezo-based fashion. To this end, the drive unit can include one piezoelectric element or else a plurality of piezoelectric elements mechanically and electrically connected to one another in suitable fashion. The piezo-based drive unit formed hereby allows use of the effect that the piezoelectric elements, to which the AC voltage is applied as electrical drive signal, modify their mechanical dimensions, for example a position or the like. The treatment needle is mechanically connected to the piezo-based drive unit, and so the desired drive effect can thus be attained during intended operation. In the case of an electromagnetic drive unit, by contrast, an electromagnetic-mechanical transducer can accordingly be provided, which for example can be acted upon via an alternating current as electrical drive signal. Using an alternating magnetic field, for example, a magnetizable actuator of the transducer can be actuated in order to be able to produce the desired mechanical movement. In general, the electrical drive unit has electrical terminals at which the electrical drive signal can be applied thereto in order that the desired mechanical movement of the treatment needle can be attained.

According to various embodiments, the generator unit is preferably an electronic unit configured to provide the electrical control variable for the electrical drive unit. For this purpose, the generator unit can include an electronic circuit, for example the inverter or the like. Furthermore, the generator unit can, of course, also include a control unit in the form of a hardware circuit, in particular a program-controlled computer unit, possibly provided to complement the hardware circuit or else as an alternative thereof. The generator unit thus supplies the electrical drive signal. The generator unit is configured to provide the electrical drive signal in time-varying fashion, preferably in the style of an oscillation. An oscillation frequency is preferably greater than approximately 10 kHz, particularly preferably in the order of approximately 40 kHz. Depending on the type of electrical power to be supplied to the drive unit, an amplitude of the oscillation, for example, can be set via the generator unit. Naturally, it is also possible to provide the electrical drive signal in clocked fashion, for example in the style of a pulse sequence, for example a burst and/or the like. In order to be able to obtain a specific predeterminable type of oscillation of the treatment needle, the generator unit can also provide the electrical drive signal at a plurality of frequencies and corresponding respective amplitudes and phase angles with respect to one another.

The disclosure makes use inter alia of the idea that in an oscillation-free or low-oscillation state of the treatment needle, the drive unit is able to provide the electrical contact signal as soon as there is contacting of the particle. As a result of the detection unit being able to be coupled to the electrical drive unit, the electrical contact signal from the drive unit can be detected via the detection unit. Therefore, as regards oscillations brought about via the drive signal, the treatment needle movement should have decayed to such an extent that the contact signal can be reliably detected via the detection unit. For this purpose, provision can for example be made for the decay of the oscillation of the treatment signal following the deactivation of the drive signal by the generator unit to be detected and for the detection of the electrical contact signal from the drive unit to be activated in the detection unit as soon as the detected signal is smaller than a specified or specifiable comparison value. As a result, it is possible to obtain decoupling with regards to the drive function and the sensor function of the drive unit. Thus, inter alia, the disclosure is based precisely on using the handpiece like a sensor unit outside the intended use during a treatment for eye lens emulsification.

According to various embodiments, the oscillating state of the treatment needle brought about by the drive unit does not only include the oscillation of the treatment needle while the electrical drive signal from the generator unit is applied to the drive unit but also includes a decay period which follows the deactivation of the electrical drive signal by the generator unit and during which there is, at least in part, a decay of the oscillation of the treatment needle. As a rule, the treatment needle will continue to oscillate during the finite decay period following the deactivation of the electrical drive signal, until the oscillation of the treatment needle has substantially decayed, preferably completely decayed, on account of a damping of the oscillation. Overall, the invention allows contact of the particle on the treatment needle to be detected without having to implement additional measures on the ophthalmic surgical handpiece. This means that the ophthalmic surgical system, in particular the console, can be retrofitted with comparatively little outlay in order to be able to realize this additional functionality. The low-oscillation state denotes a state in which the treatment needle either does not oscillate or has at most a first oscillation amplitude. Contact of a particle with the treatment needle leads to a second oscillation amplitude of the treatment needle which is detected by the evaluation unit as electrical contact signal from the electrical drive unit, with the second oscillation amplitude being greater than the first oscillation amplitude. The drive unit is deactivated during the low-oscillation state. Accordingly, the treatment needle is not driven by oscillation.

Evaluation of the detected electrical contact signal might include the evaluation of a curve profile, the evaluation of a period duration, the evaluation of an amplitude and/or the like. Evaluation can be implemented via an electronic evaluation unit suitable to this end, the latter possibly including a hardware circuit and/or a programmable computer unit for this purpose. The evaluation unit can be included at least in part by the detection unit or the control unit of the console. The evaluation can further enable determination of a size, a hardness or a speed of the particle. To this end, an appropriate analysis of the electrical contact signal can be performed within the scope of the evaluation. In this case, the evaluation can consider parameters which were empirically ascertained at an earlier stage during the production or initialization of the ophthalmic surgical system. Evaluation of the detected signal can also include a spectral analysis and statistical methods, for example in order to be able to determine a direction of the particle contacting the needle.

However, the disclosure is not only suitable for detecting contact of the particle with the treatment needle; it is in particular also suitable for being able to remove an occlusion in the region of the treatment needle, especially in relation to the aspiration. As a result of the operation of the ophthalmic surgical handpiece or its treatment needle only needing to be activated when there is contact with the eye lens or particles of the eye lens, the disclosure therefore allows the heat input into the eye to be reduced significantly. The treatment needle needs to be operated in oscillatory fashion by the drive unit only once there is contact with a particle or the eye lens. Hence, the treatment on the eye, in particular on the eye lens, can be significantly improved, especially with regards to the heat input, as a result of the reduction in the activation of the treatment needle oscillation obtainable hereby. Moreover, improved removal of particles together with the aspiration fluid can also be achieved at the same time because the disadvantageous fluid-dynamic effects known from the prior art can be reduced.

According to various embodiments, the invention can be connected with a function allowing at least partly automated deactivation of an output of the drive signal, for example because no or hardly any particles are present, there no longer is contact with the eye lens and/or the like. To this end, provision can for example be made for a detection of the presence of particles in the aspiration fluid, for example as disclosed in DE 10 2020 118 887 A1 or further documents. Hence, it is possible to achieve an operation of the handpiece in which a drive signal is essentially only output to the drive unit if ultrasonic energy is required for emulsification purposes. If there is no contact with any particle or the eye lens, the energy output can be terminated automatically, and the detection mode can be activated. Naturally, in an alternative to that or in addition, provision can also be made for the energy output to be terminated manually by a surgeon. Overall, this allows a significant reduction in the heat input into the eye.

An embodiment proposes that the electrical contact signal is detected outside the application of the electrical drive signal to the electrical drive unit. This embodiment allows an electrical line rendering the drive unit electrically couplable to the generator unit or console to also be used simultaneously for the detection of the electrical contact signal by the detection unit. Since, as a rule, the drive signal will probably have a significantly larger amplitude or deflection than the electrical signal due to the particle contacting the treatment needle, the detection unit does not need to be operated while the drive signal is applied to the electrical drive unit. To this end, the detection unit can be separated from the electrical line by way of a separate switching means or a switching unit, in order to protect the detection unit from overuse. For example, this can be realized via an electromechanical and/or electronic switching unit. Hence the detection unit can preferably be connected to the electrical line as soon as the drive signal is deactivated by the generator unit. At the same time, this configuration allows detection of the decay of the oscillating state of the treatment needle via the detection unit.

It is also proposed that the detection of the electrical contact signal is activated only after the expiry of a specified time interval that starts the moment the electrical drive signal ends. For example, the specified time interval can be chosen such that the decay of the treatment needle oscillation following the deactivation of the drive signal has reliably taken place, even under disadvantageous circumstances. A start time of the specified time interval can be coupled with the time of deactivation of the drive signal, in particular also coincide therewith. To this end, an appropriate control signal can be provided by the generator unit or a control unit of the console, the control signal being able to trigger the start of the specified time interval. Moreover, expiry of the time interval can trigger an activation signal for the detection unit which activates the detection unit for the purpose of detecting the electrical contact signal. This can give rise to automatic timing which can ensure a reliable function of the detection unit.

According to various embodiments, the time interval is determined on the basis of a mechanical damping of the oscillation of the treatment needle. For example, the time interval might have been ascertained on the basis of empirical measurements or the like. However, provision can also be made for the time interval to be additionally also determined on the basis of an amplitude of the drive signal at the time of deactivation. According to various embodiments, the time interval is determined in such a way that the oscillation of the treatment needle has substantially decayed at the end of the time interval. Depending on requirements, besides the mechanical damping and/or the amplitude of the drive signal, further values can additionally or alternatively also be considered, where necessary, in order to determine the time interval. The time interval can be determined in a range from a few microseconds to a few milliseconds. However, the time interval is preferably shorter than 0.5 s.

It is also proposed that detection of the electrical contact signal by the detection unit is deactivated upon an activation of the generator unit to output the electrical drive signal. This embodiment takes account of the fact that in an active state of the drive unit, the drive signal whose amplitude is greater than the amplitude of the electrical contact signal allows only unsatisfactory detection or capture by the detection unit or does not allow it at all. Operation of the detection unit is therefore unnecessary and can be deactivated, for example in order to save energy, protect the detection unit from overuse, avoid faults and/or the like. For example, deactivation might include an electrical separation of the detection unit from the drive unit. Electrical separation can be achieved via the switching unit already explained above. However, provision can also be made for the detection unit to be able to include a limiting unit which automatically deactivates the detection unit, or else merely deactivates the evaluation, in the case of a signal value which is greater than a specified further comparison value.

An embodiment proposes that determination of contact of the particle with the treatment needle is followed by an activation of the generator unit to output the electrical drive signal. This embodiment allows the treatment needle to be automatically put into the active operating state or allows the generator unit to be automatically activated to output the electrical drive signal, with the result that the electrical drive signal need only be provided when there also is contact with the particle or the eye lens. This can achieve improved control of the treatment needle, and so a particularly low heat input into the eye can be realized.

As regards the console, it is also proposed that the generator unit and the detection unit are electrically connected in parallel on the drive unit side. This configuration is advantageous in that no additional electrical line is required to connect the handpiece to the console or to establish the electrical connection between the console and the drive unit of the handpiece. The electrical line used to electrically connect the generator unit to the electrical drive unit can simultaneously also be used by the detection unit, in order to capture the electrical contact signal. Therefore, no changes to the handpiece need to be implemented in order to realize the invention. Thus, the invention can also already be used in available handpieces without modifying them. Connection of the generator unit and the detection unit in parallel is therefore preferably provided on the console side. Moreover, it is naturally also possible to configure the generator unit and the detection unit at least partially in one piece, with the result that only a single assembly in this respect need be present in the console. This is found to also be advantageous, inter alia, if available consoles should be retrofitted in order to use the invention. In this respect, the assembly with the generator unit present only needs to be replaced by a corresponding assembly which includes the generator unit connected to the detection unit. Hence, the outlay can be kept very low on the console side, too, and so the invention overall can be additionally realized with little outlay in an ophthalmic surgical system. In principle, it is alternatively also possible for the generator unit and the detection unit to be connected electrically in series on the drive unit side. In this case, the generator unit is preferably configured to allow an electrical connection of the detection unit and the drive unit, the connection providing an electrical resistance that is as small as possible, particularly preferably an electrical short circuit for instance, when the provision of the drive signal by the generator unit is deactivated.

BRIEF DESCRIPTION OF DRAWINGS

The invention will now be described with reference to the drawings wherein.

DETAILED DESCRIPTION

Figure 1:
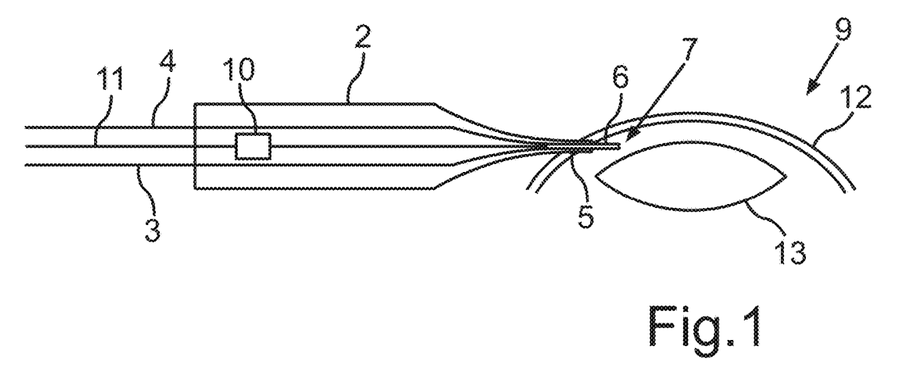
FIG. 1 shows a schematic illustration of an ophthalmic surgical handpiece of an ophthalmic surgical system for emulsifying an eye lens of a human eye during the intended operation.
Figure 2:
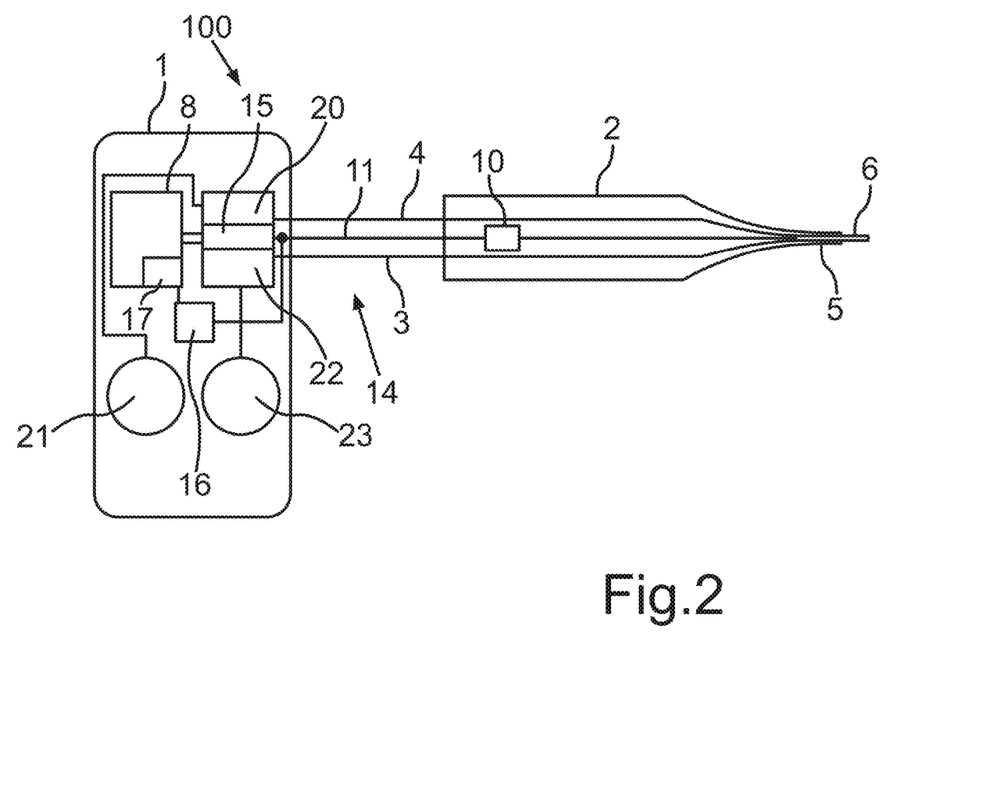
FIG. 2 shows a schematic illustration of an ophthalmic surgical system having the handpiece as per FIG. 1 and a console, wherein the handpiece is detachably connected to the console via a connection line.

FIG. 1 shows a schematic illustration of an ophthalmic surgical handpiece 2 of an ophthalmic surgical system (FIG. 2). The handpiece 2 includes a treatment needle 6 which protrudes at one end from a sleeve 5 connected to a housing of the handpiece 2. The treatment needle 6 is configured as a hollow needle and provides a portion of an aspiration line 3. On the treatment side, the treatment needle 6 includes a needle tip 7 which also provides an outlet opening of the aspiration line 3 at the same time. The needle tip 7 serves to emulsify a crystalline eye lens 13 of an eye 9.

The handpiece 2 also includes an electrical drive unit 10 which is configured in the present case as a piezo-based drive unit. The piezo-based drive unit 10 includes at least one piezo element and preferably a stack of a plurality of piezo elements (not depicted here), which are mechanically connected to one another and to an end of the treatment needle 6 opposite the needle tip 7. The piezo elements are also electrically connected to one another. As a result, it is possible in a manner dependent on a drive signal 36 (FIG. 4) to transmit vibrations of the electrical drive unit 10 to the treatment needle 6, with the result that appropriate oscillatory movements of the needle tip 7 can be performed during the intended use.

To perform a treatment within the scope of ophthalmic surgery, for example when treating a cataract, the treatment needle 6, in particular the needle tip 7 thereof, is introduced into a region of the eye 9 to be treated, in particular into a region of the eye lens 13 to be treated. By way of the electrical drive unit 10, the treatment needle 6 is excited to perform ultrasonic oscillations, whereby the eye lens 13 can be comminuted or emulsified. During the treatment, an irrigation fluid is supplied via an irrigation line 4. At the same time, the aspiration fluid is discharged from the eye 9 via the aspiration line 3. Together with the aspiration fluid, lens fragments or particles are removed from the eye 9 at the same time. During the treatment, irrigation fluid supply and aspiration fluid discharge are preferably controlled such that a collapse of the anterior chamber of the eye 9 is prevented.

FIG. 2 shows a schematic illustration of the ophthalmic surgical system 100, which includes a console 1 that is connected to the handpiece 2 as per FIG. 1 via a connection line 14. In the present configuration, provision is made for the connection line to also include a portion of the aspiration line 3 and a portion of the irrigation line 4 in addition to an electrical line 11. The respective line portions of the irrigation line 4 and of the aspiration line 3 are flow-coupled to corresponding line portions in the handpiece 2. In alternative configurations, provision can be made for the connection line 14 to have a multipart configuration, for example by virtue of a respective separate tube being provided for the respective portion of the aspiration line 3 and of the irrigation line 4. On the handpiece side, the connection line 14 can be securely connected to the handpiece 2. At the opposite end of the connection line 14, provision is preferably made for a suitably configured attachment for detachably connecting the connection line 14 to the console 1. However, this is not depicted in the figures.

As also evident from FIG. 2, the console 1 includes an irrigation fluid regulator 20, to which the irrigation line 4 is connected. The irrigation fluid regulator 20 is also flow-connected to an irrigation fluid reservoir 21. The irrigation fluid regulator 20 is also communicatively connected to a control unit 8 of the console 1. A flow and/or a pressure of the irrigation fluid in the irrigation line 4 can be set via the irrigation fluid regulator 20, in a manner dependent on a control signal from the control unit 8. For example, the irrigation fluid reservoir 21 can be arranged so as to be integrated into the console 1. However, provision can also be made for the irrigation fluid reservoir 21 to be configured to be at least partially separate from the console 1 and be connected to the irrigation fluid regulator 20 via a separate line. A detachable connection can be provided in this case, too.

A corresponding structure can also be provided for the aspiration fluid. As evident from FIG. 2, the console 1 includes an aspiration fluid regulator 22, to which the aspiration line 3 is connected. Furthermore, the aspiration fluid regulator 22 is flow-connected to an aspiration fluid collection container 23, which is likewise included by the console 1 in the present case. In this case, provision can also be made for the aspiration fluid collection container 23 to be configured to be at least partially separate from the console 1 and be connected via a line. The aspiration fluid regulator 22 sets a flow speed and/or a negative pressure of the aspiration fluid in the aspiration line 3. The aspiration fluid regulator 22, too, is communicatively connected to the control unit 8 and controlled by the latter. The control unit 8 is appropriately configured such that a pressure in the capsular bag can be maintained substantially at a constant level during the treatment on the eye 9.

The console 1 also includes a generator unit 15 which serves to provide a time-varying electrical drive signal for the electrical drive unit 10 of the handpiece 2. In the present case, the electrical drive signal is formed by AC voltage, the frequency of which can be set within a range from approximately 10 kHz to approximately 80 KHz. According to various embodiments, the frequency is preferably in the order of approximately 40 kHz. Depending on the power set for the treatment, an amplitude of the AC voltage can be in a range from approximately 0 V to approximately 1000 V, for example approximately 300 V. The generator unit 15 is detachably connected to the electrical line 11 such that the AC voltage can be applied to the electrical drive unit 10 during intended operation. Depending on the application of AC voltage, the treatment needle 6 is mechanically excited to oscillate such that the desired treatment can be performed on the eye 9, in particular on the eye lens 13. In the present case, the generator unit 15 operation can likewise be controlled by the control unit 8, for which purpose the generator unit 15 is communicatively connected to the control unit 8. Thus, for example, the control unit 8 can control the operation of the handpiece 2, in particular the operation of the treatment needle 6. For example, the frequency, an amplitude and/or the like can be set by virtue of creating appropriate quantities of the AC voltage via the generator unit 15. In this way, a mechanical power of for example up to approximately 50 W can be provided on the oscillating needle tip 7 for the treatment. As a rule, this mechanical power is sufficient to be able to emulsify even a particularly hard cataract.

An undesirably strong buildup of heat may arise during the treatment, not only but especially in the region of a cornea 12 of the eye 9. In this case, the buildup of heat can be so strong that the cornea 12 is damaged, this for example resulting in burns. This might create lasting damage. It is therefore desirable to keep an unwanted heat input as small as possible. Especially the longitudinal oscillation of the treatment needle 6 might also give rise to a force that counteracts the aspiration-type suction effect in the region of the needle tip 7. This may lead to the repulsion of particles or lens fragments that should be flushed within the scope of the aspiration. As a consequence, this might result in a longer duration of the operation and an increase in the overall energy input into the eye 9.

A significant improvement can be achieved by way of the invention in this context, specifically by virtue of the oscillating operation of the treatment needle 6 being rendered dependent on contact with a particle 19 or a lens fragment. Outside of contact, the treatment needle 6 need not be driven by oscillation.

For this purpose, the drive unit 10 is used like a sensor unit. Therefore, the console 1 additionally includes a detection unit 16, which is likewise connected to the electrical line 11. As a result, the detection unit 16 is connected to the electrical line 11 so as to be connected in parallel with the generator unit 15. The detection unit 16 is also communicatively connected to the control unit 8, to be precise with an evaluation unit 17 of the control unit 8 in particular. Via the detection unit 16, it is possible to detect an electrical contact signal 35 from the electrical drive unit 10 on the electrical line 11 when the particle 19 contacts the treatment needle 6. For this purpose, the generator unit 15 is deactivated during the detection such that it does not output any drive signal 36 to the electrical drive unit 10. Thus, the electrical contact signal 35 from the electrical drive unit 10 can be detected in the oscillation-free or low-oscillation state of the treatment needle 6, to be precise via the detection unit 16. Then, the detected electrical signal 35 can be evaluated via the evaluation unit 17 such that contact of the particle 19 with the treatment needle 6 can be determined on the basis of the evaluation. Hence, the information with regards to when the treatment needle 6 contacts any particle or lens fragment is available in the control unit 8.

In principle, it is thus possible to distinguish between two operating states during the treatment. In a first operating state, the ultrasonic energy is used to comminute or emulsify the eye lens 13. In this operating state, there is at least partial contact between the treatment needle 6 or needle tip 7 and the eye lens 13. Therefore, ultrasonic energy should be output from the treatment needle 6 to the eye lens 13 directly and preferably without delay in this operating state. In a second operating state, the ultrasonic energy cannot be used to comminute or emulsify the eye lens 13 because there is no contact between the treatment needle 6, in particular the needle tip 7, and the eye lens 13. To keep the ultrasonic energy output as small as possible in this operating state and/or to avoid a repulsion of particles 19 or lens fragments to be flushed, the ultrasonic energy output should be stopped or at least reduced. A detection of switches between these two operating states that is as quick as possible is therefore advantageous.

Moreover, a suction force should be increased by increasing a negative pressure in the aspiration line 3 already at the first signs of an occlusion forming. According to various embodiments, the output of ultrasonic energy should be at least started or increased in a manner synchronous therewith. What can be achieved thereby is that the particle 19 rests directly on the vibrating needle tip 7, and a comminution or emulsification can be implemented very quickly. The amount of heat input introduced into the eye 9 can be significantly reduced as a result of the short comminution period rendered possible thereby. What can further be achieved by increasing the suction force is that the event of the particle 19 being repulsed from the needle tip 7 as a result of the ultrasonic energy can be avoided, whereby the treatment duration can likewise be reduced.

Figure 3:
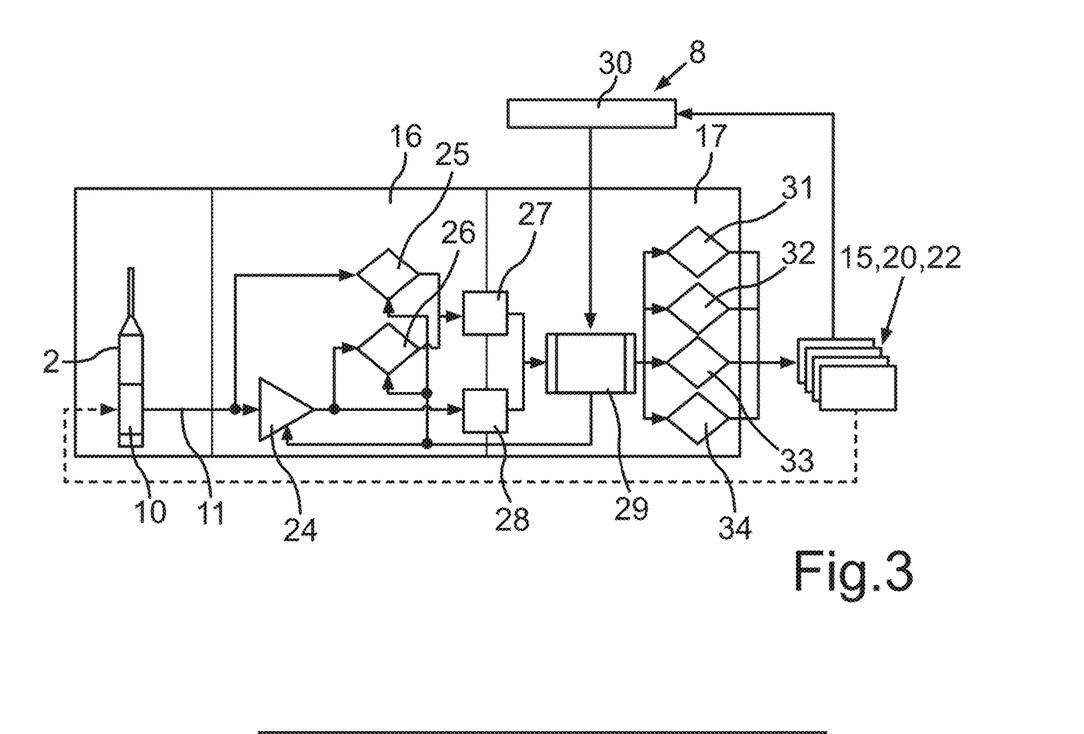
FIG. 3 shows a schematic block diagram of a detection unit and an evaluation unit of the console as per FIG. 2, which is electrically connected to a drive unit of the handpiece as per FIG. 1 via the connection line.

FIG. 3 shows a schematic block diagram of a possible schematic structure for the detection unit 16 and the evaluation unit 17 in order to realize the invention. The invention is based inter alia on detecting an electrical contact signal 35 in the oscillation-free or low-oscillation state of the treatment needle 6.

Thus, the generator unit 15 is deactivated for the detection state and does not provide any drive signal 36 for the electrical drive unit 10 of the handpiece 2. Following this, that is, preferably after the decay of the oscillating state of the treatment needle 6 brought about by the electrical drive unit 10, the detection unit 16 can use the electrical drive unit 10 in the manner of a sensor. If the particle 19 contacts the treatment needle 6, a force acts on the piezo elements of the electrical drive unit 10, whereupon a voltage is induced on account of the piezoelectric effect, and this voltage can be tapped at the electrodes in contact with the piezo elements and hence can be tapped overall on the electrical line 11. Attention is drawn to the fact that no separate piezo element is configured as a sensor; instead, all piezo elements of the handpiece 2 are used as a sensor. A curve of this voltage is depicted as electrical contact signal 35 in FIG. 4. This voltage can be detected via the electrical line 11 and via the detection unit 16 and can be evaluated via the evaluation unit 17. This will be explained below. Furthermore, an assumption made in the present case is that the deactivation of the generator unit 15 leads to the electrical contact signal 35 created by the electrical drive unit 10 in this operating state not being damped, or not being damped substantially, by the generator unit 15. Optionally, the generator unit 15 can be configured appropriately to this end.

The detection unit 16 includes an amplifier 24 and also a first comparator 25 and a second comparator 26. The amplifier 24 and also the first and the second comparator 25, 26 are also connected to a digital signal processing unit 29 of the evaluation unit 17 which, as yet to be explained below, provides appropriate operating parameters for the amplifier 24 and for the first and the second comparator 25, 26. On the input side, the amplifier 24 is connected to the electrical line 11. In the present case, the amplifier 24 serves as a linear amplifier and amplifies the electrical signal 35. The amplified electrical contact signal 35 is then supplied to an analog-to-digital converter 28 of the evaluation unit 17. Moreover, on the input side, the first comparator 25 is also connected to the electrical line 11. The first comparator 25 compares the signal on the electrical line 11 with a first comparison value. The first comparison value is chosen such that the operation of the generator unit 15 can be detected reliably. The amplifier 24 has a corresponding overload-capable configuration. Whether or not the generator unit 15 is activated can thus be determined by an output signal of the first comparator 25. The corresponding output signal is supplied to the evaluation unit 17 via a comparison data supply 27. Moreover, on the input side, the second comparator 26 is connected to the output of the amplifier 24. The second comparator 26 compares the output signal of the amplifier 24 with a second comparison value chosen such that the electrical contact signal 35 can be reliably detected vis-à-vis interference signals. The corresponding comparison result is likewise supplied to the evaluation unit 17 via the comparison data supply 27. Hence, the information as to whether an electrical contact signal 35 is present is available to the evaluation unit 17.

The evaluation unit 17 includes the digital signal processing unit 29 which is connected to both the analog-to-digital converter 28 and the comparison data supply 27. The digital signal processing unit 29 processes the corresponding signals and determines when an electrical contact signal 35 is present and the properties thereof. Moreover, the digital signal processing unit 29 is connected to a system control unit 30 of the control unit 8, by which system information is provided to the digital signal processing unit 29. For example, the system control unit 30 might include a database or the like. The digital signal processing unit 29 moreover provides the parameters for the amplifier 24, for example a gain factor or the like, and the first and the second comparison value for the first and second comparator 25, 26, respectively. As a result, it is already possible during the intended operation to set the detection unit 16 in needs-based fashion for a reliable determination of the contact of the particle 19 with the treatment needle 6. As a result of the digital signal processing unit 29, appropriate control signals can be provided for an ultrasonic power control unit 31 and an ultrasonic pattern unit 32. An ultrasonic power of the generator unit 15 can be set via the ultrasonic power control unit 31. Moreover, a pulse pattern of the ultrasonic power intended to be provided by the generator unit 15 can be set via the ultrasonic pattern unit 32. These two units are therefore likewise connected to the generator unit 15. Moreover, the digital signal processing unit 29 provides appropriate data for a contact determination unit 33. On the basis of the data provided by the digital signal processing unit 29, the contact determination unit 33 ascertains whether there is contact between the particle 19 and the treatment needle 6. This output signal can also be provided to the generator unit 15, for example in order to activate the ultrasonic power output or the output of the electrical drive signal 36.

Moreover, the digital signal processing unit 29 provides data for a fluid control unit 34 which provides appropriate control signals for the irrigation fluid regulator 20 and the aspiration fluid regulator 22. As a result, it is for example possible to appropriately set the pressure and/or the flow conditions in the irrigation line 4 and in the aspiration line 3, with the result that a treatment that is as reliable and as successful as possible can be realized. For example, this might include increasing a negative pressure in the aspiration line 3 in the event of an occlusion being detected. The digital signal processing unit 29 can evaluate the electrical contact signal 35, for example in relation to an amplitude, a frequency, a decay behavior and/or the like, in order to calculate further data therefrom, for example for the units 31 to 34. In the present case, the evaluation unit 17 includes an appropriately configured program-controlled computer unit. It is self-evident that an appropriate hardware circuit or else a combination with a computer unit might also be provided to this end in alternative configurations. Under certain circumstances, it might also be possible to manage without the amplifier 24 in alternative embodiments, depending on the structure. The digital signal processing unit 29 can further include one or more digital filters, a pattern recognition, a classification of the contact and/or the like. The digital signal processing unit 29 can also provide a system observation, wherein the assumption can be made that when no contact is determined between the particle 19 and the treatment needle 6, there will generally also be no particles 19 or lens fragments in the region of the treatment needle 6. The output of ultrasonic energy can therefore be reduced or even terminated. This allows reduction of the heat input into the eye 9, especially in the region of an incision wound. If, by contrast, contact is detected, the ultrasonic energy provision can be activated or else increased automatically, and so emulsification can be performed. Moreover, it is possible to also detect or determine further states or properties, for example a size, a hardness or else a speed of the particle 19, with the result that it is possible to determine, for example by way of an observation over time, whether it is possible to advantageously set an activation, a deactivation, an increase or a decrease of the ultrasonic energy output or else an application of specific pulse patterns during the ultrasonic output. In an advantageous configuration, provision can be made for a high ultrasonic energy output to be started with, which is subsequently reduced over time.

Figure 4:
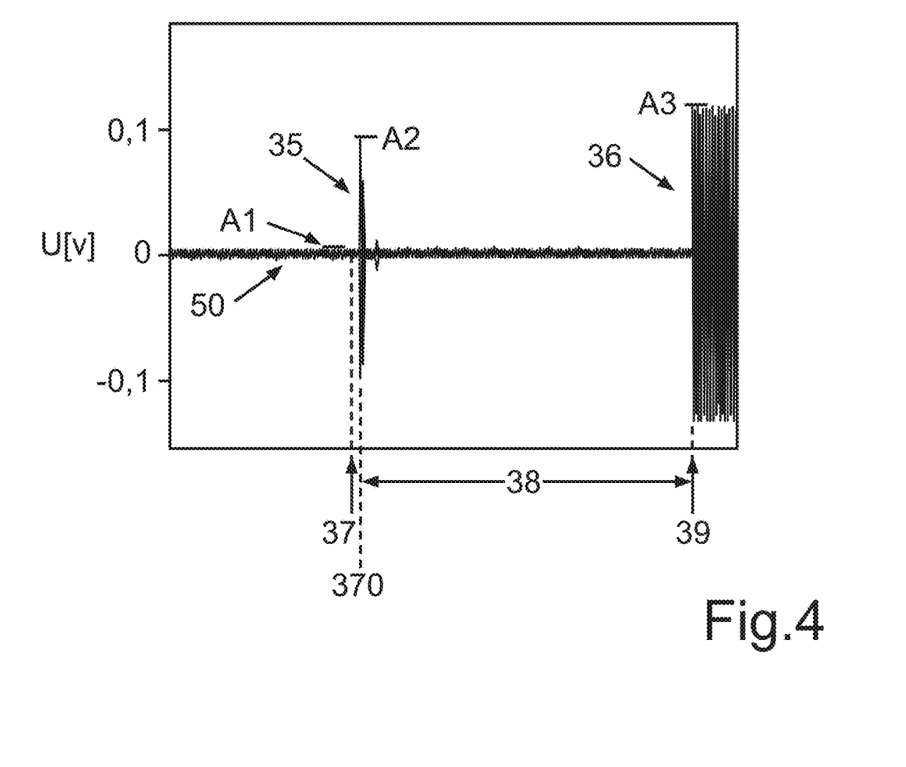
FIG. 4 shows a schematic diagram which shows a graph of an electrical contact signal from the drive unit of the handpiece in which a particle contacts a treatment needle of the handpiece.

The function of the invention is furthermore explained on the basis of a diagram as depicted in FIG. 4, which shows a voltage curve on the electrical line 11. An abscissa is assigned to time and an ordinate is assigned to voltage. It is evident that no drive signal 36 is present before a contact time 37. At this time, ultrasonic energy output as a result of activating the generator unit 15 is deactivated. Accordingly, the drive signal 36 is substantially approximately zero. The particle 19 contacts the treatment needle 6 at the contact time 37. As a result of the generator unit 15 substantially not damping the electrical contact signal 35 that arises on the electrical line 11, the detection unit 16 is able to detect the voltage of the contact signal 35. This is depicted via the short pulse that starts at time 370 after the contact time 37. The electrical contact signal 35 has a smaller amplitude A2 than the amplitude A3 of the drive signal 36. The amplitude A2 preferably is no more than 90%, preferably no more than 50% and particularly preferably no more than 30% of the amplitude A3 of the drive signal 36. According to various embodiments, the amplitude A2 is at least twice as high as the amplitude A1 of the system oscillation noise 50, which represents the low-oscillation state. The amplitude A2 of the electrical contact signal 35 can thus be clearly distinguished from the amplitude A1 of the system oscillation noise 50. The first and the second comparator 25, 26 serve this purpose; by way of their digital values, they assist the digital signal processing unit 29 with contact determination. The digital signal processing unit 29 allows the detected electrical contact signal 35 to be evaluated such that, as a result, it is possible to activate the generator unit 15 for outputting the electrical drive signal. This is implemented directly after the detection of the electrical contact signal 35. With the time resolution shown in FIG. 4, the start of the drive signal would almost coincide with the start of the contact signal 35, with the result that the electrical drive signal is not shown in FIG. 4 for reasons of clarity. However, FIG. 4 shows the start of the electrical drive signal 36 when using a previously conventional method, in which an occlusion on the needle tip 7 is detected. This drive signal 36 starts at the start time 39 which is delayed by a time interval 38 after the start of the drive signal as per the invention, wherein the time interval 38 can be approximately 80 ms. In any case, what can be achieved by the invention is that the electrical drive signal can be activated automatically in a timely fashion following a contact of the particle 19 with the treatment needle 6, with the result that emulsification is made possible. The invention therefore allows the input of ultrasonic energy into the eye 9 to be controlled in automated or at least partly automated fashion, with the result that the heat input overall can be reduced.

Figure 5:
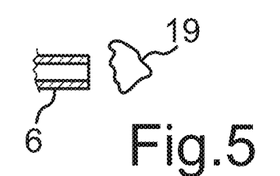
FIG. 5 shows a schematic illustration of an end of a treatment needle of the handpiece as per FIG. 1 and a particle distant therefrom.
Figure 6:
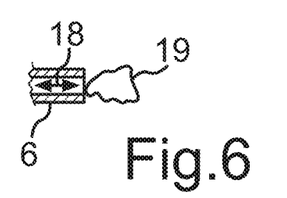
FIG. 6 shows a schematic illustration like FIG. 5, in which the particle partly occludes an aspiration opening of the treatment needle.
Figure 7:
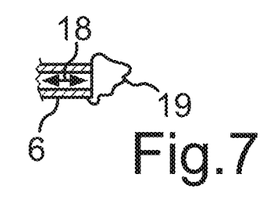
FIG. 7 shows a schematic illustration like FIG. 5, in which the particle fully occludes the aspiration opening of the treatment needle.
Figure 8:
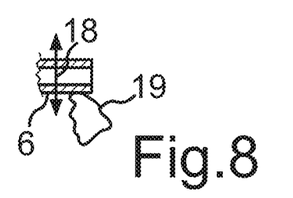
FIG. 8 shows a schematic illustration like FIG. 5, in which the particle laterally contacts a needle tip of the treatment needle.

By way of schematic illustrations, FIGS. 5 to 8 show how contact between the particle 19 and the treatment needle 6 can be implemented. In FIGS. 6 to 7, provision is made for the treatment needle 6 to be excited longitudinally; this is indicated by an arrow 18 in the direction of longitudinal extent of the treatment needle 6. FIG. 5 illustrates the situation where the particle 19 still is at a small distance from the treatment needle 6. According to various embodiments, the ultrasonic energy output is preferably still deactivated in this state. FIG. 6 shows a partial occlusion, in which the particle 19 partly occludes the opening of the aspiration line 3. This contact—as explained above—can be determined, with the result that ultrasonic energy output can then be activated in automated fashion, and hence an emulsification of the particle 19 is rendered possible. The same can also be implemented in the situation as per FIG. 7, in which there is complete occlusion by the particle 19. In this case, too, contact can be determined, and ultrasonic energy output can be activated automatically, with the result that emulsification of the particle is possible. By contrast, FIG. 8 shows a situation in which the treatment needle 6 is excited to oscillate transversely as a result of contact with the particle 19, by virtue of the particle 19 contacting the treatment needle 6 laterally. This can likewise be determined via the invention, and so the ultrasonic energy output can also be activated in automated fashion here.

In a further configuration, provision can additionally be made for ultrasonic energy output to be capable of being deactivated automatically by way of a further system observation in the case of no occlusion being present, for example as disclosed in U.S. Pat. No. 9,144,517. The disclosure of this US patent should be considered included by the present application. As a result, it is possible to control a virtually completely automatic provision of ultrasonic energy, in such a way that the latter is only provided if required to advance the treatment. Additionally, a change of flow in the aspiration line 3, for example, can also be considered to this end. For example, if—as depicted in FIG. 5—a change of flow in the aspiration line 3 is detected before the particle 19 comes into contact with the needle tip 7, then provision can for example be made for the ultrasonic output to already be activated, even though no contact is present yet. The power can be increased in the event of contact. Moreover, in a further configuration, provision can be made for the negative pressure in the aspiration line 3 to be initially increased as a first step in the event of determining contact and a deactivated drive signal 36. Only once a sufficient occlusion has been determined is the ultrasonic output subsequently activated in a second step. In this case, use of the invention thus leads to only the aspiration fluid regulator 22 initially being acted upon in the first step. Then, the generator unit 15 is only acted upon in a second step.

The invention can thus achieve the following advantages: Optimized activation of the ultrasonic power can be achieved by way of a quicker detection and determination of particle 19 contact with the treatment needle 6. In this case, the sensor system can be arranged in the handpiece 2 and need not—like in the case when the occlusion is detected on the basis of a change in pressure and/or flow—be arranged in a pump of the console 1, for example arranged at a distance of two meters, wherein a corresponding tube connection may have interactions and, in particular, a dead time in the measurement path as a consequence, the latter possibly being 60 to 70 ms, for example. It is possible to achieve a reduction in the equivalent phaco time (EPT) or treatment duration on account of a faster activation of the ultrasonic output, the ultrasonic output in fact occurring virtually immediately when required. Further, an aspirated particle can be kept on the needle tip 7 of the treatment needle 6 for longer since a faster increase in negative pressure is attainable in the aspiration line 3 in the case of contact, whereby an efficiency and a reduction in the EPT or heat input can be achieved. The invention allows use of ultrasonic energy on account of particle contact rather than the occlusion detection that is conventional to date. It is possible to detect particle contact on an outer side or end face of the treatment needle 6. As a result, an ultrasonic energy supply is rendered possible in the event of torsional and/or lateral movements of the treatment needle 6, and the reliability of contact detection is increased during a sculpting phase, in which trenches are drawn through the eye lens 13. By contrast, the prior art only provides for an occlusion detection on the basis of a change in flow, in which the particle 19 brings about a change in the aspiration fluid flow or is situated in the flow path.

A further application of an ultrasonic energy supply due to an event can lie in a combination with the current fluidic occlusion detection. For example, a fluidic occlusion detection can be used to trigger ultrasound activation if the particle 19 is advantageously in front of an outlet opening of the aspiration line 3 but not yet in mechanical contact with the treatment needle 6, as shown in FIG. 5. Loss-of-contact detection can also be detected in the same way. Moreover, additional trigger events connected to the contact of the particle 19 with the treatment needle 6 can be determined by way of the invention, for example should the particle 19 contact an end face or an outer side of the treatment needle 6. The invention enables a fast contact detection. At the same time, the invention can be realized with little outlay, in particular at low cost. The handpiece need not be modified.

Figure 9:
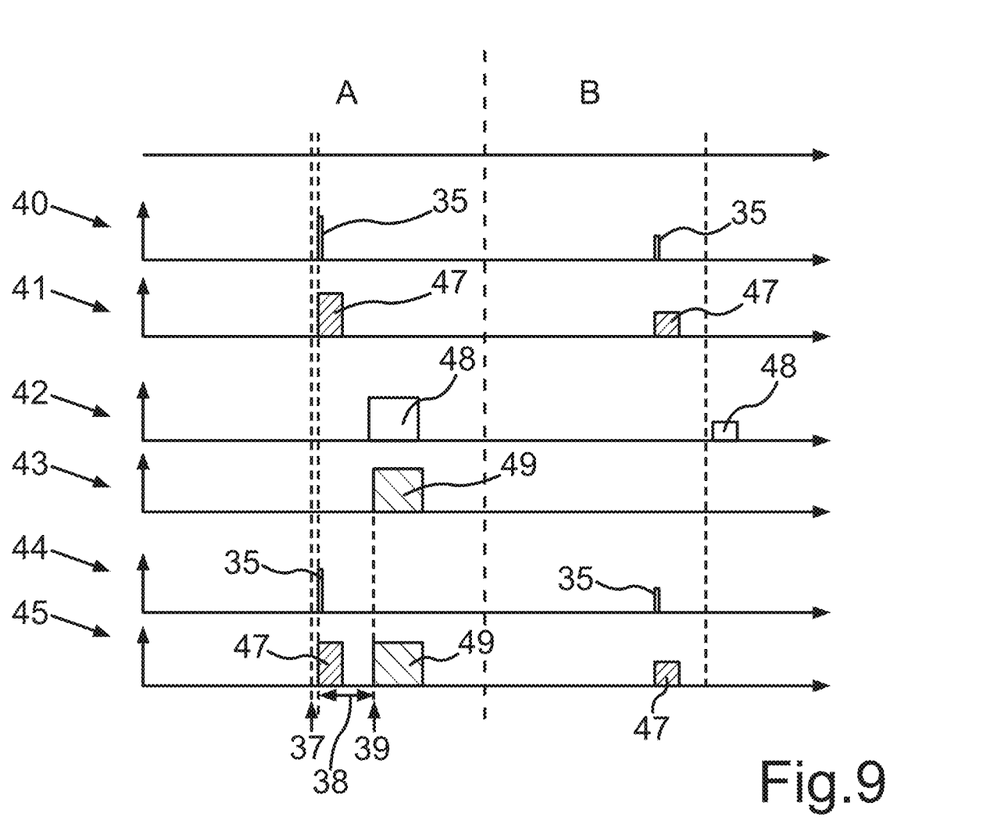
FIG. 9 shows schematic signal/time diagrams for contrasting the effect of the invention vis-à-vis the prior art; and, FIG. 10 shows a schematic diagram as a detail of the illustration of FIG. 4, in which a graph is used to depict a voltage at the electrical drive unit of the handpiece when a particle contacts the treatment needle as per any one of FIGS. 6 to 8.

Once again, FIG. 9 contrasts the advantages of the invention vis-à-vis the prior art. To this end, FIG. 9 shows six temporally synchronous signal diagrams 40 to 45, the abscissas of which are each assigned to time and the ordinates of which are each assigned to voltages as signal values. With regards to the abscissa, the diagrams are divided into a region A and a region B. Region A relates to a situation as depicted on the basis of FIGS. 5 to 7. Region B relates to a situation as depicted on the basis of FIG. 8.

Diagrams 40 and 41 relate to the application of the invention. Signal diagram 40 shows the detection of contact according to the invention, to be precise an end-face contact on the needle tip 7 in region A and a contact transversely to a longitudinal extent of the treatment needle 6 in region B of the signal diagrams. It is evident from signal diagrams 40 and 41 that, according to the invention, an electrical drive signal 36 in the form of ultrasonic pulses 47 can be output virtually immediately after the determination of contact at the time 37. This is true both for end-face contact and for lateral contact. Diagrams 42 and 43 show the corresponding situations for the prior art. As depicted on the basis of diagram 42, it is evident that, in region A, an occlusion is associated with a strongly delayed detection as per a graph 48. The output of an electrical drive signal in the form of ultrasonic pulses 49, as depicted as per diagram 43, is implemented with a corresponding delay. Moreover, no ultrasonic pulse 49 is output in the event of a lateral contact transversely to the longitudinal extent of the treatment needle 6. Thus, this situation cannot be reliably identified in the prior art. The advantage arising from the use of the invention emerges even more clearly on the basis of diagrams 44 and 45. Diagram 44 depicts the electrical signals 35 captured by the invention for regions A and B. As per diagram 45 for region A, it is evident that the invention allows a shorter reaction time vis-à-vis the prior art, which is labeled by a time interval 38 in diagram 45. In contrast to the invention, the prior art supplies no reaction in the event of a lateral contact transversely to the longitudinal extent of the treatment needle 6 in region B.

Figure 10:
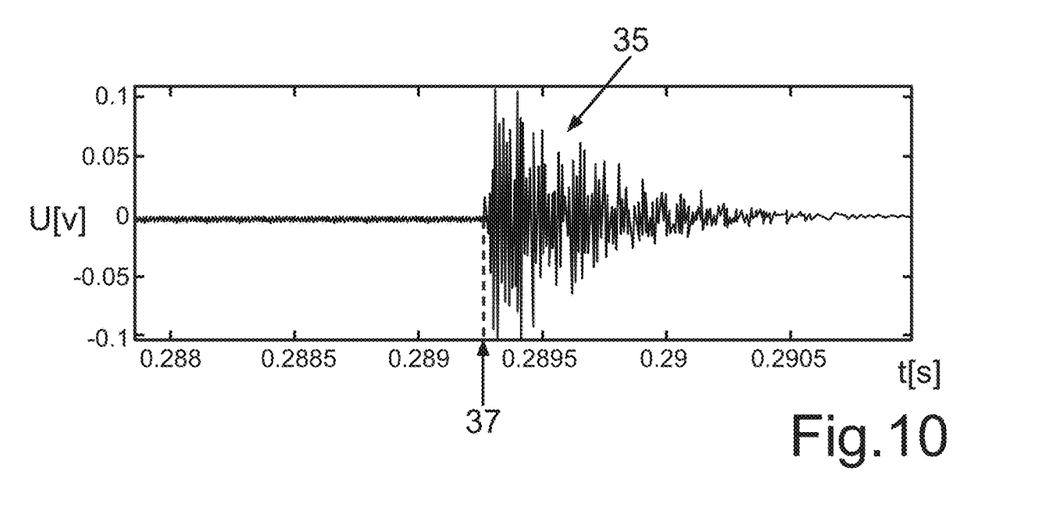

FIG. 10 shows a schematic diagram of a voltage/time graph. In this case, the drive signal 36 output is deactivated. The voltage on the electrical line 11 is likewise depicted in this case. The particle 19 contacts the treatment needle 6 at the time 37. As a result, the latter is excited to oscillate, and this brings about a damped AC voltage as electrical contact signal 35 via the drive unit 10. This signal can be detected via the detection unit 16, and so it can be supplied to the evaluation unit 17. It is evident that the amplitude of the oscillation of the electrical contact signal 35 depicted here is approximately 80% of the amplitude of the drive signal 36; cf. also FIG. 4. The detection unit 16 therefore has a corresponding configuration such that it cannot be brought into an overloaded state by the drive signal 36.

The embodiments serve exclusively for explaining the invention and are not intended to restrict it.

It is understood that the foregoing description is that of the preferred embodiments of the invention and that various changes and modifications may be made thereto without departing from the spirit and scope of the invention as defined in the appended claims.

The invention claimed is:

1. A console of an ophthalmic surgical system for operating an ophthalmic surgical handpiece which is connectable to the console and includes a treatment needle and an electrical drive unit for driving the treatment needle by oscillation, the console comprising:
   at least one generator unit configured to provide a time-varying electrical drive signal for the electrical drive unit;
   a detection unit electrically couplable to the electrical drive unit, said detection unit being configured to detect an electrical contact signal of the electrical drive unit on account of a second oscillation amplitude in a low-oscillation state of the treatment needle during which the treatment needle oscillates at a maximum first oscillation amplitude prior to the second oscillation amplitude;
   said at least one generator unit being configured to provide the time-varying electrical drive signal such that the electrical drive unit is deactivated during the low-oscillation state;
   an evaluation unit configured to evaluate the detected electrical contact signal and to determine contact of a particle with the treatment needle on a basis of the evaluation; and,
   said detection unit being configured to detect the electrical contact signal when the second oscillation amplitude is greater than the maximum first oscillation amplitude, wherein said second oscillation amplitude is generated by the needle contacting a particular part of the eye.

2. The console of claim 1, wherein said at least one generator unit and said detection unit are electrically connected in parallel on a drive unit side.

3. The console of claim 1, wherein the console is configured such that the detection of the electrical contact signal by said detection unit is activated only after an expiry of a specified time interval that starts at a moment the time-varying electrical drive signal ends.

4. The console of claim 3, wherein the console is configured such that the specified time interval is determined on a basis of a mechanical damping of the oscillation of the treatment needle.

5. The console of claim 1, wherein the console is configured such that at least a size, a hardness or a speed of the particle is determined on a basis of the evaluation of the electrical contact signal by said evaluation unit.

6. The console of claim 1, wherein the console is configured such that detection of the electrical contact signal by said detection unit is deactivated upon an activation of said at least one generator unit to output the time-varying electrical drive signal.

7. The console of claim 1, wherein the console is configured such that the determination of contact of the particle with the treatment needle via said evaluation unit is followed by an automatic activation of said at least one generator unit to output the time-varying electrical drive signal.

8. The console of claim 1, wherein said time-varying electrical drive signal has a third oscillation amplitude of the needle; and, said second oscillation amplitude is at most 90% of the third oscillation amplitude.

9. The console of claim 8, wherein said second oscillation amplitude is at most 30% of the third oscillation amplitude.

10. An ophthalmic surgical system for treating an eye, the ophthalmic surgical system comprising:
- an ophthalmic surgical handpiece for working on an eye lens, said ophthalmic surgical handpiece including a treatment needle and an electrical drive unit for driving said treatment needle by oscillation;
- a console for operating said ophthalmic surgical handpiece to which said ophthalmic surgical handpiece is connectable at least during an intended operation;
- said console including a generator unit which is couplable to said ophthalmic surgical handpiece and is configured to provide a time-varying electrical drive signal for said electrical drive unit of said ophthalmic surgical handpiece;
- said console including a detection unit electrically couplable to said electrical drive unit, said detection unit being configured to detect an electrical contact signal of said electrical drive unit on account of a second oscillation amplitude in a low-oscillation state of said treatment needle during which said treatment needle oscillates at a maximum first oscillation amplitude prior to the second oscillation amplitude;
- said generator unit being configured to provide the time-varying electrical drive signal such that said electrical drive unit is deactivated during the low-oscillation state;
- said console including an evaluation unit configured to evaluate the detected electrical contact signal and to determine contact of a particle with said treatment needle on a basis of the evaluation; and,
- said detection unit being configured to detect the electrical contact signal when the second oscillation amplitude is greater than the maximum first oscillation amplitude, wherein said second oscillation amplitude is generated by the needle contacting a particular part of the eye.

11. The ophthalmic surgical system of claim 10, wherein said generator unit and said detection unit are electrically connected in parallel on a drive unit side.

12. The ophthalmic surgical system of claim 10, wherein said console is configured such that the detection of the electrical contact signal by said detection unit is activated only after an expiry of a specified time interval that starts at a moment the time-varying electrical drive signal ends.

13. The ophthalmic surgical system of claim 12, wherein said console is configured such that the specified time interval is determined on a basis of a mechanical damping of the oscillation of said treatment needle.

14. The ophthalmic surgical system of claim 10, wherein said console is configured such that at least a size, a hardness or a speed of the particle is determined on a basis of the evaluation of the electrical contact signal by said evaluation unit.

15. The ophthalmic surgical system of claim 10, wherein said console is configured such that detection of the electrical contact signal by said detection unit is deactivated upon an activation of said generator unit to output the time-varying electrical drive signal.

16. The ophthalmic surgical system of claim 10, wherein said console is configured such that determination of contact of the particle with said treatment needle via said evaluation unit is followed by an activation of said generator unit to output said time-varying electrical drive signal.

17. A console of an ophthalmic surgical system for operating an ophthalmic surgical handpiece which is connectable to the console and includes a treatment needle and an electrical drive unit for driving the treatment needle by oscillation, the console comprising:
- at least one generator unit configured to provide a time-varying electrical drive signal for the electrical drive unit;
- a detection unit electrically couplable to the electrical drive unit, said detection unit being configured to detect an electrical contact signal of the electrical drive unit on account of a second oscillation amplitude in a low-oscillation state of the treatment needle, wherein the needle is configured to oscillate at a maximum first oscillation amplitude in said low-oscillation state and the second oscillation amplitude is generated by the needle contacting a particular part of an eye;
- said at least one generator unit being configured to provide the time-varying electrical drive signal such that the electrical drive unit is deactivated during the low-oscillation state;
- an evaluation unit configured to evaluate the detected electrical contact signal and to determine contact of a particle with the treatment needle on a basis of the evaluation; and,
- said detection unit being configured to detect the electrical contact signal when the second oscillation amplitude is greater than the maximum first oscillation amplitude.

* * * * *